Oct. 2, 1962 J. L. HUNTER ET AL 3,056,880
MEANS AND METHOD OF CONTINUOUSLY STRETCHING SHEET STOCK
Filed Dec. 8, 1960 3 Sheets-Sheet 2

JOSEPH L. HUNTER
THOMAS A. MARTIN
INVENTORS.

BY

ATTORNEYS.

JOSEPH L. HUNTER
THOMAS A. MARTIN
INVENTORS.

United States Patent Office 3,056,880
Patented Oct. 2, 1962

3,056,880
MEANS AND METHOD OF CONTINUOUSLY STRETCHING SHEET STOCK
Joseph L. Hunter and Thomas A. Martin, Riverside, Calif., assignors, by mesne assignments, to Aluminum Research Corporation, New York, N.Y., a corporation of Delaware
Filed Dec. 8, 1960, Ser. No. 74,587
5 Claims. (Cl. 219—50)

This invention relates to means and method of continuously stretching sheet stock, and included in the objects of this invention are:

First, to provide a means and method of continuously stretching sheet stock wherein a continuous sheet is passed around a first set of tensioning rolls, then around a second, spaced set of tensioning rolls, electrically isolated from the first set of tensioning rolls, while current is applied to the portion of the sheet bridging between the sets of rolls so as to raise the temperature and reduce the strength of the sheet stock as it approaches the second set of rolls to the point that under the applied tension the sheet yields a predetermined amount.

Second, to provide a means and method of continuously stretching sheet stock wherein the current for heating the sheet stock is supplied by bus bars disposed in contiguous relation to the bridging section of the sheet stock, and wherein a direct current, on which is superposed a fluctuating current, is utilized in which the direct current effects resistance heating of the bridging sheet stock, and the fluctuating current causes inductive heating of the stock by reason of the inductive field surrounding the bus bars; the inductive heating being utilized to compensate, particularly at the side margins of the sheet, for nonuniform resistance heating of the sheet.

Third, to provide a means and method of continuously stretching sheet stock wherein the bus bars underlying the bridging sheet stock may be individually connected or disconnected from the heating circuit to accommodate sheet stocks of different widths and thicknesses and to vary the inductive heating effect.

With the above and other objects in view, as may appear hereinafter, reference is directed to the accompanying drawings in which.

Figure 1:
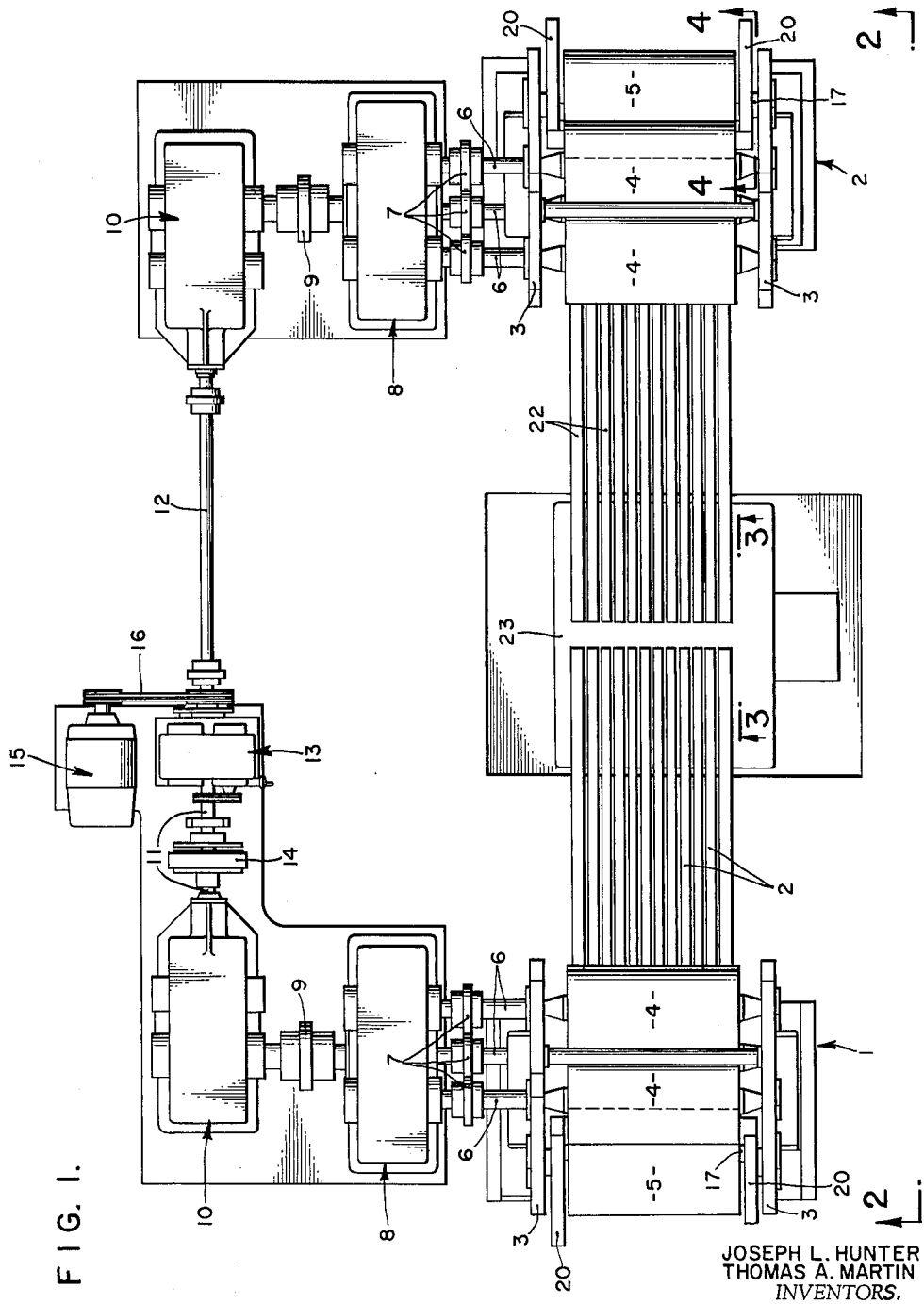
FIGURE 1 is a diagrammatical plan view of the means for continuously stretching sheet stock, the sheet stock being omitted from the view.
Figure 2:
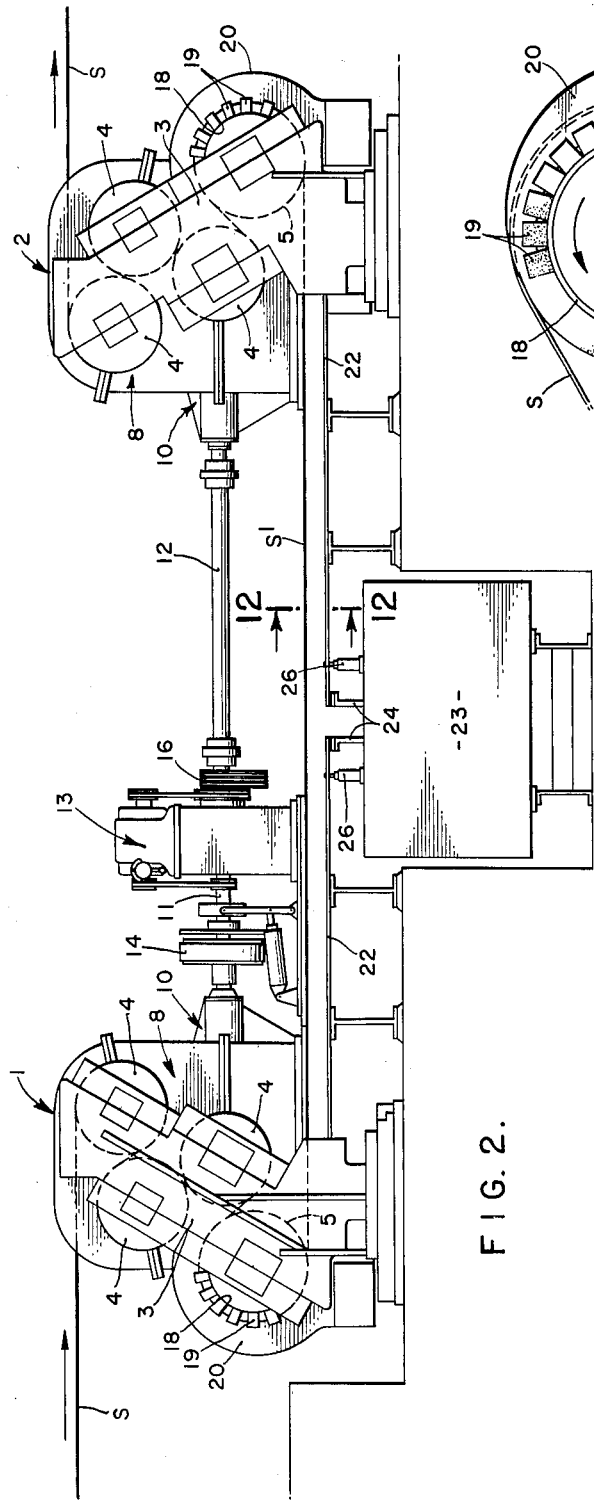
FIGURE 2 is a substantially diagrammatical end view thereof taken through 2—2 of FIGURE 1, showing the sheet stock in position.
Figure 4:
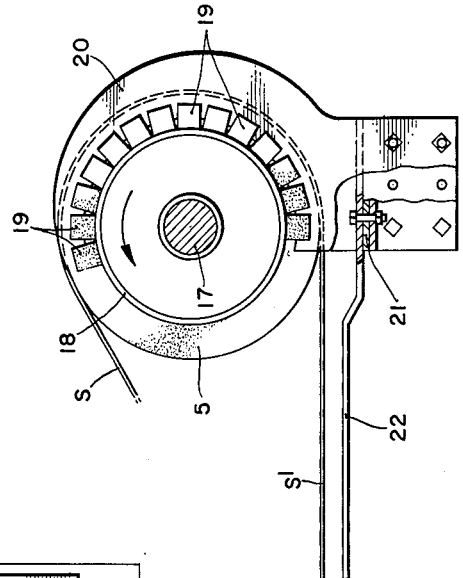
FIGURE 4 is an enlarged, fragmentary, sectional view taken through 4—4 of FIGURE 1.
Figure 12:
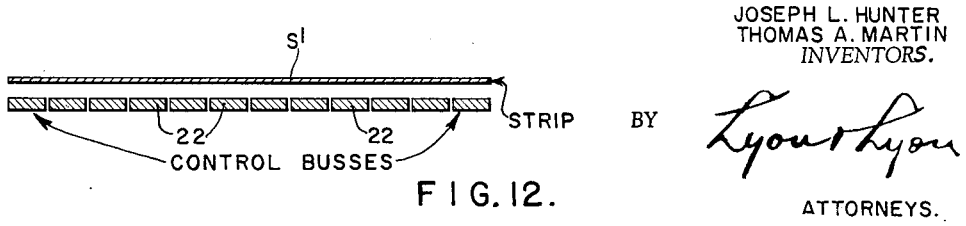

FIGURES 8, 9, 10, and 11 are diagrammatical, fragmentary views of sheet stock showing the type of flaws to be corrected by stretching;

FIGURE 12 is a diagrammatical, transverse, sectional view taken through 12—12 of FIGURE 2, showing the relationship of the bus bars and the sheet stock.

The means or apparatus for continuously stretching sheet stock utilizes two tensioning stations 1 and 2, which are identical except that one is left hand and the other is right hand. Each station includes a frame structure 3 which supports a cluster of tensioning rolls 4. In the construction illustrated, three tensioning rolls are shown at each station. Below each cluster of tensioning rolls is a current transferring roll 5. The tensioning rolls are so arranged that sheet stock S may be wrapped approximately three-quarters of a turn about each tensioning roll 4.

At the initial tensioning station 1, the sheet stock passes from the tensioning roll cluster 4 around the corresponding current transferring roll 5, and then continues from the first current transferring roll to the transferring roll of the tensioning station 2. A bridging portion $S^1$ of the sheet stock, between the two current transferring rolls 5, extends horizontally. After passing partially around the current transferring roll 5 of station 2, the sheet stock passes around the tensioning rolls 4.

The sheet stock S is supplied from a supply reel, not shown, and is wrapped on a receiving reel. In practice conventional means, not shown, are provided for attaching the final end of a preceding length of sheet stock to a succeeding length thereof.

The tensioning rolls 4 may be surfaced with rubber or other elastomer, so that the coefficient of friction between the sheet stock S and tensioning rolls is sufficiently high that the requisite tension may be applied to the sheet stock.

The tensioning rolls of each station 1 and 2 are provided with shafts 6 which are joined by couplings 7 to output shafts extending from a gear housing 8. The input shaft to the gear housing 8 is joined by a coupling 9 to gears within a reduction gear housing 10. The two reduction gear housings are provided with drive shafts 11 and 12 which may be in coaxial relation, and are connected to opposed output shafts extending from a differential speed drive 13. The differential speed drive is so arranged the the drive shaft 12 connected with the tensioning station 2 rotates at an accurately adjusted, slightly higher speed than the drive shaft 11 associated with the tensioning station 1. Interposed in the drive shaft 11 is an overload clutch 14.

The differential speed drive 13 is connected to a motor 15 through any suitable drive means such as a belt drive 16. By control of the speed of the motor 15, the rate of movement of the sheet stock through the tensioning stations 1 and 2 may be controlled. By adjustment of the differential speed drive 13, the tension to which the sheet stock is subjected, and consequently the amount of stretch, may be accurately controlled.

The current transferring rolls 5 are formed of a material capable of making good electrical contact with the sheet stock S, for example, the current transferring rolls may be formed of graphite.

The current transferring rolls 5 are mounted on shafts 17 which are suitably insulated from the rolls. The ends of the current transferring rolls 5 are provided with slip rings 18 which are engaged by current transferring brushes 19 held in arcuate brush holders 20. The brush holders at the ends of each current transferring roll 5 are joined by collector bars 21. A set of bus bars 22 extend from each collector bar 21 under the bridging portion $S^1$ of the sheet stock S. The bus bars 22 from the two tensioning stations 1 and 2 terminate in contiguous but spaced relation to each other at the center of the bridging portion $S^1$.

Figure 3:
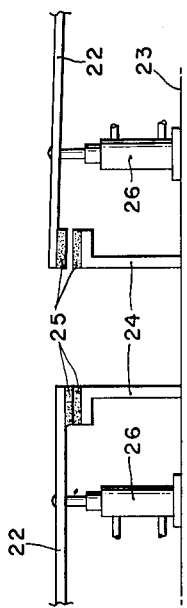
FIGURE 3 is an enlarged, fragmentary, elevational view taken through 3—3 of FIGURE 1.

Mounted below the contiguous ends of the bus bars 22 is a power supply 23 having output terminals 24, preferably one output terminal for each bus bar 22. Contacts 25 are interposed between each bus bar and its terminal 24. Positioned under each bus bar 22, near its contact 25, is a power cylinder 26 capable of deflecting the bus bar so as to break the contacts 25, as shown in FIGURE 3.

The two sets of bus bars 22 are approximately equal in width to the maximum width of the sheet stock S, as shown in FIGURE 12, and are intended to be accommodated by the tensioning stations 1 and 2. If narrower sheet stock is to be passed through the apparatus, the laterally outward bus bars are disconnected so that the effective width of the bus bars corresponds to that of the sheet stock.

Operation of the means or apparatus for continuously stretching sheet stock is as follows:

The bridging portion $S^1$ of the sheet stock S forms the load across the output terminals 24 of the power supply 23. Sufficient power is supplied to heat the sheet stock to lower its yield strength to the point where the sheet stock yields or stretches under the tension applied to the bridging portion $S^1$ between the tensioning stations 1 and 2. The sheet stock reaches its yielding temperature as it approaches the current transferring roll 5 of the tensioning station 2 so that all stretching of the sheet stock occurs adjacent to this roll.

In the stretching of aluminum sheet stock, the aluminum sheet stock, the aluminum need be raised only to a maximum temperature in the range of 200° to 300° F., well within the temperature to which rubber, or if not rubber another elastomer, is capable of withstanding.

The power supply 23 may be a D.C. source. However, due to the fact that the lateral margins of the sheet stock tend to radiate heat faster than the central portion thereof, there is a tendency for the center part to be heated more than the margins to produce the kind of defect or flaw shown in FIGURE 8; that is, there is a tendency under such conditions to produce a center buckle 27.

Figure 9:
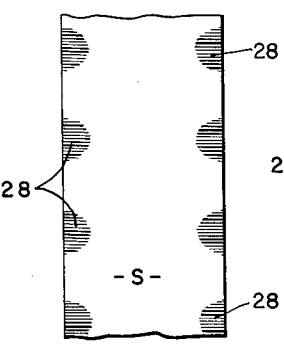
Figure 10:
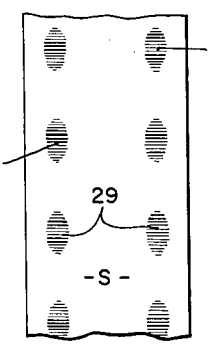
Figure 11:
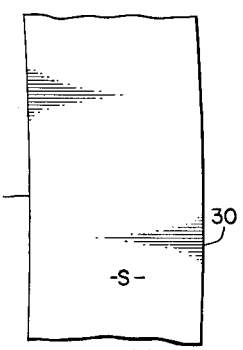

If the sheet stock S has an edge buckle 28 or offcenter buckle 29, as shown in FIGURES 9 and 10, heating by a direct current source may counteract such initial defects. However, if the initial defect in the sheet stock consists in the center buckle 27 or in the camber 30, indicated in FIGURE 11, direct current heating will tend to aggravate the condition.

Figure 5A:
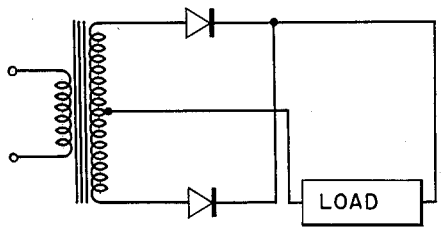
FIGURE 5a is a circuit diagram of a single phase full wave rectifier.
Figure 5B:
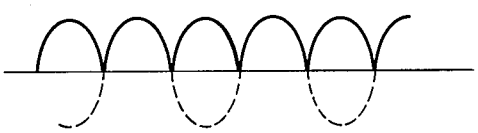
FIGURE 5b is a diagram indicating the rectified wave shape.
Figure 6A:
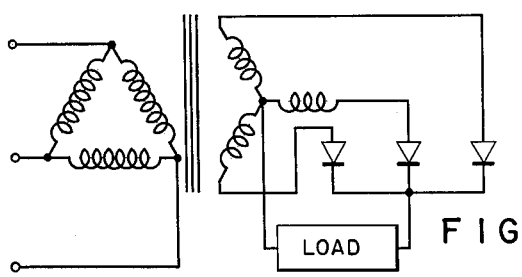
FIGURE 6a is a diagram showing a three phase half wave rectifier.
Figure 6B:
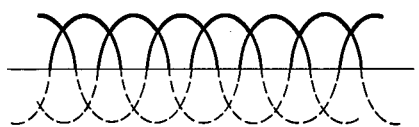
FIGURE 6b is a diagram showing the corresponding rectified wave shape.
Figure 7A:
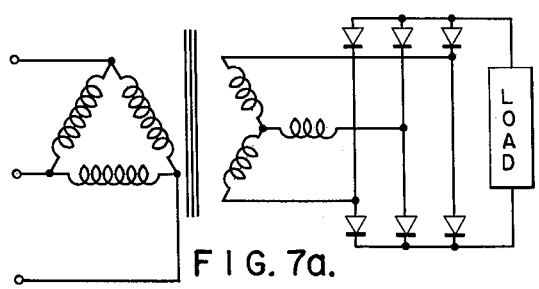
FIGURE 7a is a diagram showing a three phase full wave rectifier.
Figure 7B:
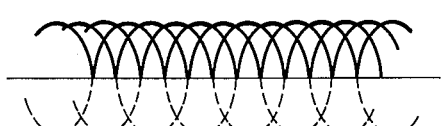
FIGURE 7b is a diagram showing the corresponding rectified wave shape.
Figure 8:
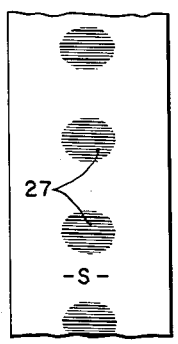

Significant improvement in the heating of the sheet stock S is accomplished by utilizing a rectified current on which is superposed a fluctuating current so that the bridging portion $S^1$ is heated inductively as well as by reason of its resistance. This may be accomplished in several ways, for example: by utilizing single phase full wave rectified current, as indicated in FIGURES 5a and 5b; or three phase half wave rectified current, as represented in FIGURES 6a and 6b; or three phase full wave rectified current, as represented in FIGURES 7a and 7b; or by other means whereby a combination direct current and fluctuating or pulsating current is employed.

Inductive heating is produced by the field created by the pulsating current passing through the bus bars 22. The bus bars are sufficiently close to the bridging portion $S^1$ of the sheet stock as to place the sheet stock within the field. It is obvious from an examination of FIGURES 5b, 6b, and 7b that the inductive effect is the least with the rectified current shown in FIGURE 7b, and the greatest of the three types shown in FIGURE 5b. Therefore, the type of rectified current is selected which will produce the desired inductive heating of the range of sheet stock for which the apparatus is designed. The primary effect of inductive heating of the sheet stock is to apply greater heat to the lateral margins than to the central part. In fact, the inductive heating of the margins may be such as to counteract the effect of heat dissipation along the lateral margins of the sheet stock.

If desired the inductive heating may over compensate, or under compensate, depending upon the type of defect initially present in the sheet stock. In other words, by selection of the bus bars 22 through which current is transmitted to the current transferring rolls 5 and by control of the inductive heating effect, the transverse distribution of the heating effect on the sheet stock may be accurately controlled.

The method of continuously stretching sheet stock, which may be accomplished by means other than the means hereinbefore shown and described, consists essentially in passing sheet stock continuously between two stations while applying tension to that portion of the sheet stock bridging between these stations, and simultaneously introducing current into the bridging portion of the sheet stock at these stations so that the bridging portion of the sheet stock is heated by its own resistance; and in addition heating the bridging portion of the sheet stock inductively in such a manner as to obtain a predetermined distribution of the total heating of the bridging portion across its width or transversely thereof.

While a particular embodiment of this invention has been shown and described, it is not intended to limit the same to the exact details of the construction set forth, and it embraces such changes, modifications, and equivalents of the parts and their formation and arrangement as come within the purview of the appended claims.

What is claimed is:

1. A continuous sheet stretcher, comprising: a first set of tensioning rolls terminating in a current transferring roll; a second set of tensioning rolls having an initial current transferring roll; drive means for said sets of rolls including means for driving the second set of rolls at a preselected faster rate than said first set of rolls, said sets of rolls adapted to receive continuous strip stock with a portion thereof bridging therebetween; and means for applying current to said current transferring rolls; said current transferring rolls being electrically isolated from each other except through the bridging portion of said sheet stock whereby said sheet stock is heated by said current to a temperature, as it approaches the second set of tensioning rolls, wherein, under the tension applied, said sheet stock yields and stretches a predetermined amount.

2. A continuous sheet stretcher, comprising: a first set of tensioning rolls terminating in a current transferring roll; a second set of tensioning rolls having an initial current transferring roll; drive means for said sets of rolls including means for driving the second set of rolls at a preselected faster rate than said first set of rolls, said sets of rolls adapted to receive continuous strip stock with a portion thereof bridging therebetween; a current transmitting means electrically connected with said current transferring rolls and disposed in contiguous relation to the bridging portion of said sheet stock; and means for supplying current to said current transmitting means; said current transferring rolls being electrically isolated from each other except through the bridging portion of said sheet stock whereby said sheet stock is heated by said current to a temperature, as it approaches the second set of tensioning rolls, wherein, under the tension applied, said sheet stock yields and stretches a predetermined amount.

3. A continuous sheet stretcher, comprising: a first set of tensioning rolls terminating in a current transferring roll; a second set of tensioning rolls having an initial current transferring roll; drive means for said sets of rolls including means for driving the second set of rolls at a preselected faster rate than said first set of rolls, said sets of rolls adapted to receive continuous strip stock with a portion thereof bridging therebetween; a plurality of parallel bus bars electrically connected with said current transferring rolls and disposed in contiguous relation to the bridging portion of said sheet stock; means for supplying current; and means for selectively connecting said bus bars to said current supply; said current transferring rolls being electrically isolated from each other except through the bridging portion of said sheet stock whereby said sheet stock is heated by said current to a temperature, as it approaches the second set of tensioning rolls, wherein, under the tension applied, said sheet stock yields and stretches a predetermined amount.

4. A continuous sheet stretcher, comprising: a first set of tensioning rolls terminating in a current transferring roll; a second set of tensioning rolls having an initial current transferring roll; drive means for said sets of rolls including means for driving the second set of rolls at a preselected faster rate than said first set of rolls, said sets of rolls adapted to receive continuous strip stock with a portion thereof bridging therebetween; current transmitting means electrically connected with said current transferring rolls and disposed in contiguous relation to the bridging portion of said sheet stock; a source of direct current on which is superposed a fluctuating current connected with said current transmitting means, thereby to induce current from said current transmitting means to the bridging portion of said sheet stock; said current transferring rolls being electrically isolated from each other except through the bridging portion of said sheet stock, whereby said sheet stock is resistance heated as well as inductively heated, as it approaches the second set of tensioning rolls, and wherein, under the tension applied, is stretched a predetermined amount.

5. A continuous sheet stretcher, comprising: a pair of spaced current transferring rolls adapted to supply current for heating a section of sheet stock bridging therebetween; a cluster of tensioning rolls for each current transferring roll; current carrying means disposed contiguous to said bridging sheet stock and connected with said current transferring rolls; and means for supplying a current of sufficient magnitude to effect resistance heating of the bridging section of said sheet stock, the current having a pulsating component tending to effect inductive heating of said bridging section by said current carrying means.

References Cited in the file of this patent

UNITED STATES PATENTS

| | | |
|---|---|---|
| 2,716,687 | Lackner | Aug. 30, 1955 |
| 2,716,688 | Lackner | Aug. 30, 1955 |